United States Patent
Hamburg et al.

(10) Patent No.: US 12,287,874 B2
(45) Date of Patent: Apr. 29, 2025

(54) EFFICIENT INTEGRITY MONITORING OF PROCESSING OPERATIONS WITH MULTIPLE MEMORY ARRAYS

(71) Applicant: Cryptography Research, Inc., San Jose, CA (US)

(72) Inventors: Michael Alexander Hamburg, 's-Hertogenbosch (NL); Winthrop John Wu, Pleasanton, CA (US)

(73) Assignee: Cryptography Research, Inc., San Jose, CA (US)

( * ) Notice: Subject to any disclaimer, the term of this patent is extended or adjusted under 35 U.S.C. 154(b) by 351 days.

(21) Appl. No.: 17/992,221

(22) Filed: Nov. 22, 2022

(65) Prior Publication Data

US 2023/0161877 A1 May 25, 2023

Related U.S. Application Data

(60) Provisional application No. 63/282,601, filed on Nov. 23, 2021.

(51) Int. Cl.
    *G06F 21/55* (2013.01)
(52) U.S. Cl.
    CPC ...... *G06F 21/554* (2013.01); *G06F 2221/034* (2013.01)
(58) Field of Classification Search
    CPC .................. G06F 21/554; G06F 2221/034
    See application file for complete search history.

(56) References Cited

U.S. PATENT DOCUMENTS

| 5,140,321 A | * | 8/1992 | Jung | H03M 7/3086 |
| | | | | 341/95 |
| 7,830,392 B1 | * | 11/2010 | Danskin | G06T 15/005 |
| | | | | 345/612 |
| 2008/0120303 A1 | * | 5/2008 | Selkirk | G06F 3/0608 |

(Continued)

FOREIGN PATENT DOCUMENTS

| CN | 106133706 A | * | 11/2016 | .......... G06F 12/023 |
| CN | 103620613 B | * | 6/2018 | .............. G06F 11/00 |

(Continued)

OTHER PUBLICATIONS

Ashkenazi, Asaf et al., "Platform Independent Overall Security Architecture in Multi-Processor System-on-Chip ICs for Use in Mobile Phases and Handheld Devices", 2006 World Automation Congress, 2006, pp. 1-8, doi: 10.1109/WAC.2006.375925. 8 pages.

(Continued)

*Primary Examiner* — Shahriar Zarrineh
(74) *Attorney, Agent, or Firm* — Lowenstein Sandler LLP

(57) ABSTRACT

Disclosed systems and techniques are directed to efficient integrity monitoring of computational operations using multiple memory arrays collectively representative of known events associated with the computational operations. Disclosed techniques include obtaining event identification value representative of a state of the computing device associated with execution of an operation on the computing device, obtaining memory pointers and selecting, based on the memory pointers, mapping values from multiple memory arrays, computing an event response value, and classifying the operation among a plurality of classes, based on the event response value.

21 Claims, 6 Drawing Sheets

(56) References Cited

U.S. PATENT DOCUMENTS

| | | | |
|---|---|---|---|
| 2008/0151678 A1* | 6/2008 | Ikeda | G11C 8/12 |
| | | | 711/E12.003 |
| 2014/0136810 A1* | 5/2014 | Colgrove | G06F 12/1009 |
| | | | 711/206 |
| 2014/0304489 A1* | 10/2014 | Colgrove | G06F 3/0641 |
| | | | 711/208 |
| 2014/0365745 A1* | 12/2014 | Colgrove | G06F 3/0671 |
| | | | 711/170 |
| 2017/0285976 A1* | 10/2017 | Durham | G06F 21/64 |
| 2018/0308269 A1* | 10/2018 | Baran | G06T 5/92 |
| 2019/0155746 A1* | 5/2019 | Bhatia | G06F 12/0246 |
| 2020/0327271 A1* | 10/2020 | Langhammer | H03K 19/17748 |
| 2021/0081410 A1* | 3/2021 | Chavan | G06F 9/3888 |
| 2021/0119848 A1* | 4/2021 | Ibars Casas | H04L 1/0052 |
| 2021/0182465 A1* | 6/2021 | Langhammer | G06F 7/57 |
| 2023/0152994 A1* | 5/2023 | Jiang | G06F 3/0679 |
| | | | 711/154 |
| 2023/0266890 A1* | 8/2023 | Yamparala | G06F 3/0679 |
| | | | 713/340 |
| 2023/0402085 A1* | 12/2023 | Hung | G11C 16/3495 |

FOREIGN PATENT DOCUMENTS

| | | | | | |
|---|---|---|---|---|---|
| CN | 109656837 A | * | 4/2019 | | G06F 12/0246 |
| CN | 111758086 A | * | 10/2020 | | G06F 11/3037 |
| CN | 113227994 A | * | 8/2021 | | G06F 16/11 |
| CN | 115398405 A | * | 11/2022 | | G06F 12/0246 |
| WO | WO-9309497 A2 | * | 5/1993 | | G06F 12/0848 |

OTHER PUBLICATIONS

Newsome, James et al., "Vulnerability-=Specific Execution Filtering for Exploit Prevention on Commodity Software", School of Computer Science Carnegie Mellon University Pittsburgh, PA, In Proceedings of the Network and Distributed System Security Symposium (NDSS), 2006, 30 pages.

* cited by examiner

EFFICIENT INTEGRITY MONITORING OF PROCESSING OPERATIONS WITH MULTIPLE MEMORY ARRAYS

RELATED APPLICATIONS

This application claims the benefit of U.S. Provisional Patent Application No. 63/282,601, filed Nov. 23, 2021, which is hereby incorporated herein by reference.

TECHNICAL FIELD

The disclosure pertains to computing applications, more specifically to monitoring of processing operations in various applications including security-sensitive applications. The disclosed systems and techniques allow for efficient monitoring of the integrity of processing operations by obtaining and evaluating event data that characterizes operations being performed, and by determining an approximate membership the event data in a set of known events.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
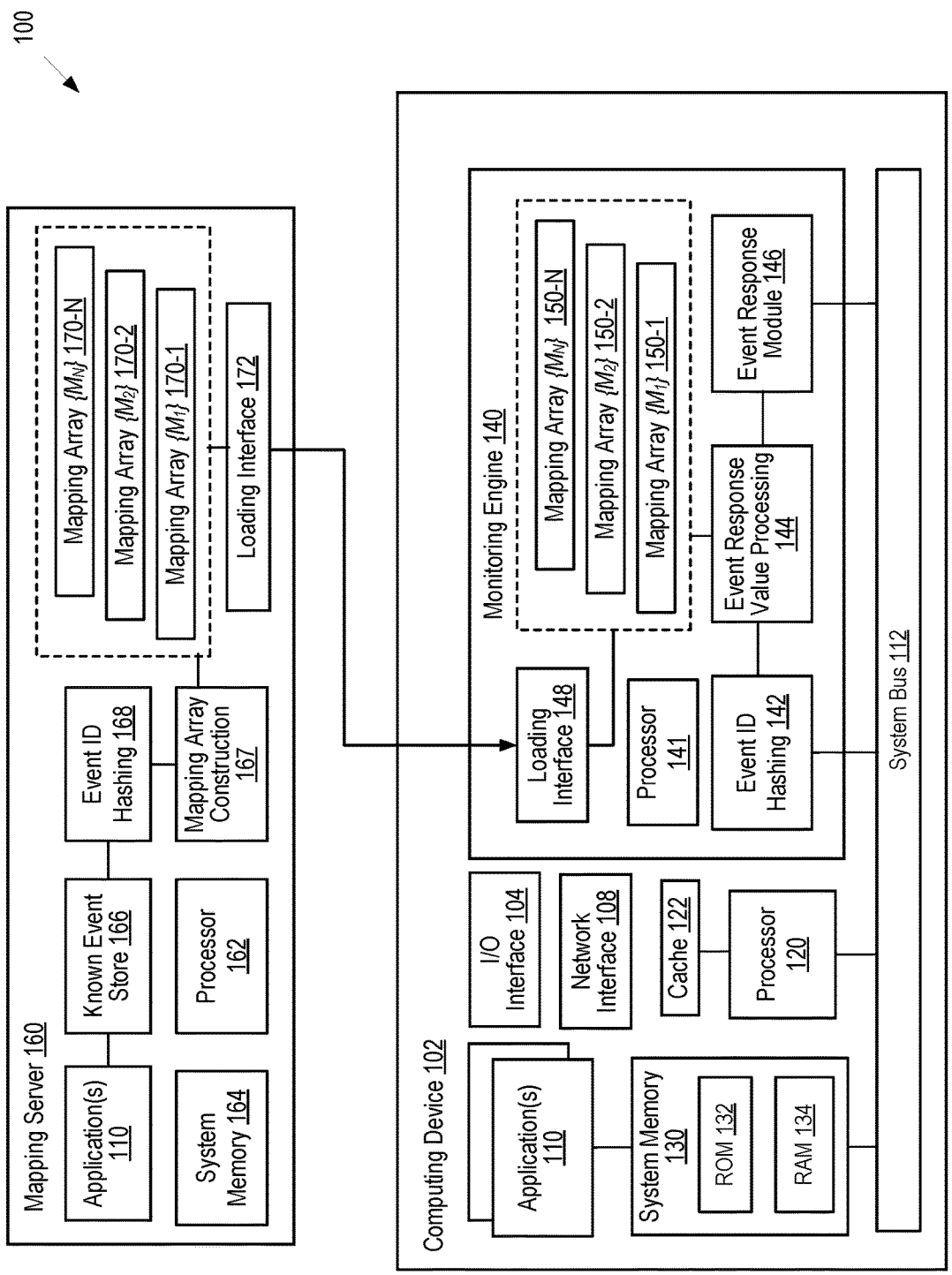
FIG. 1 is a block diagram illustrating an example system architecture in which implementations of the present disclosure may operate.

Aspects of the present disclosure are directed to integrity monitoring of operations performed by computing devices and memory states of such devices for identification of possible adversarial attacks, read and/or write operations involving restricted memory spaces and/or devices, changes to a security state, and the like. An adversarial attack may involve an attacker attempting to enter a secure domain (e.g., an operating system or a hypervisor) from a guest domain, causing a software shutdown or a hardware fault and obtaining access to a secure memory state of the processor and memory (e.g., processor registers or cache), using buffer overflows to overwrite portions of memory with a malicious code, taking over a hardware device to stage a direct memory access to a secure portion of the system memory, and the like. In some instances, a computing device may experience a number of unprovoked (by an outside attacker) events that compromise a security of data or an integrity of operations of the computing device. For example, various software bugs, power surges, hardware malfunctions, etc., may result in skipped security checks, unlocking of secure hardware resources, and so on.

Monitoring of processing operations for known good (expected) behavior, known bad behavior (malicious attacks), unexpected suspicious behavior, and the like, may be performed by sampling (e.g., periodically) a state of the processing device, e.g., copying a content of cache or various registers (or portions of the registers) of the processor, such as a control register, a memory buffer register, a memory address register, and the like. The sampled content, herein also referred to as an event identification value (EIV), may then be analyzed for indications of normal, malicious, or unexpected operations executed by the processing device. To protect against a possibility that the monitoring software has been compromised, such event checks may be entrusted to a dedicated hardware monitor. The hardware monitor may deploy a Peripheral Component Interconnect (PCI) module and use a processor System Management Mode (SMM) to securely generate and transfer the state of the processor, e.g., using a direct memory access (DMA) to the registers of the processor.

To comprehensively characterize a multitude of processing events that may occur during execution of a particular application, the monitoring device may have to keep track of a corresponding number of EIVs. Identification of a received EIV as one of the known events by a direct comparison with the stored EIVs may be impossible in real time on devices that have limited computational resources. Additionally, any number of unanticipated events may occur that are not mapped onto a database of stored EIV. Accordingly, various methods of a fast identification of a membership of a given object in a known group (e.g., normal events, known malicious events, etc.) may be used, such as Bloom filters, hash tables, and the like. Such methods can further be capable of detecting approximate membership of an unknown object in a known set, e.g., identifying a previously encountered EIV as a signature of a likely malicious attack. Efficiency of various existing techniques, however, do not approach a known theoretical limit of the maximum efficiency of determination of an approximate membership and leave significant room for improvement.

Aspects and implementations of the present disclosure address these and other shortcomings of the existing technology by describing efficient and fast processor integrity monitoring techniques and systems to perform such techniques. In some implementations, a known set of EIVs, {EIV}, may be mapped onto a set of mapping values, {EIV}→{m}. Whereas the set of mapping values, {m} may be as large (or even larger) than the set of EIVs, only a small number of mapping values may be sufficient for identification of the membership of a given EIV during the detection stage of run-time processor monitoring. For example, an EIV can be input into a hash function (or some other mapping function). The output of the hash function may include a number of pointers that identify a small (compared with a total number of known events) plurality of mapping values $m_1, m_2, \ldots$ and a number of coefficients, $C_0, C_1, C_2, \ldots$ that together identify an event response value, $R = C_0 + C_1 \cdot m_1 + C_2 \cdot m_2 + \ldots$, that classifies the event among a plurality of classes. For example, an event response value R whose n most significant bits are zero may indicate a normal event that does not require any intervention. A value R with any one of n−1 most significant bits set (equal to one), may result in an alarm and a change to a security state of the processor (e.g., a reset of the state of the processor/memory) or an abortion of a current task performed by the processor. A value R with no n−1 most significant bits set, but with the n-th most significant bit set may identify the event as belonging to a class of conditional-response events that calls for a specific response. Such a response may be identified by the remaining m bits of the event response value, which can differentiate among $2^m$ possible response actions. In some implementations, each of the mapping values $m_1, m_2, \ldots$ may be selected from a respective array $M_1, M_2$ of mapping values (with $m_1 \in M_1$, $m_2 \in M_2$, etc.). Different arrays may be stored in separate memory devices, so that the computation of the event response value may be parallelized with different processing threads (or cores) retrieving different values $m_j$ and computing the corresponding products $C_j \cdot m_j$.

During the mapping stage (training stage, calibration stage), the mapping values may be determined and organized into various memory arrays, which may subsequently be loaded into a target computing device for run-time event monitoring. During training, a set of known EIVs may be classified among one of the target classes, e.g., as referenced above, normal events, abnormal (security-sensitive) events, events requiring a specific response action, and so on, with each known event i assigned a target event response value $R^{(i)}$. The event mapping value $EIV^{(i)}$ of each event may then be processed by the same hash function (as used during the monitoring stage) to determine the coefficients $C_0^{(i)}, C_1^{(i)}, C_2^{(i)} \ldots$ as well as pointers $P_1^{(i)}, P_2^{(i)} \ldots$ into respective mapping arrays $M_1, M_2$, etc. The pointers may identify elements of the respective array, $M_1(P_1^{(i)}), M_2(P_2^{(i)}) \ldots$, whose values $m_1, m_2$ are to be calibrated to ensure that the correct event response value $R^{(i)}$ is reproduced upon the computation of the linear function of these values, $R^{(i)} = C_0^{(i)} + C_1^{(i)} \cdot m_1 + C_2 \cdot m_2 + \ldots$. Since only a small number of the mapping values (e.g., one element per array) are used to represent (during the mapping stage) or determine (during the monitoring stage) the event response value, such functions are sometimes referred to in this disclosure as sparse linear functions. During the mapping stage, an application of the sparse linear function to each of N known EIVs results in a constraint on such a number of the mapping values l as there are different mapping arrays. In situations where the number of elements in each mapping array is equal to N/l, the corresponding N linear equations determine all mapping values of each of l mapping arrays (provided that the determinant of the linear system of equations is not zero, by accident). In situations where the number of elements in each mapping array is larger than N/l, multiple solutions of the system of N linear equations exist as the equations do not constraint a larger number of elements in a unique way. In such situations, the solution may be chosen from among the possible solutions arbitrarily, e.g., randomly, or by generating additional constraints, which may set certain coefficients to a specific value, and the like.

Various implementations and modifications of these and other integrity monitoring techniques are described below. The advantages of the disclosed implementations include but are not limited to fast classification of processor-generated events with efficient memory utilization for storing an optimal amount of mapping data. Additionally, utilization of multiple mapping arrays with separate pointers into each mapping array enables further optimization of run-time monitoring with parallel execution of memory reads and multiplication operations.

FIG. 1 is a block diagram illustrating an example system architecture 100 in which implementations of the present disclosure may operate. The example system architecture 100 may include a computing device 102, whose processing operations are being monitored. Computing device 102 may have precomputed mapping values stored and accessed by a monitoring engine 140, whose operations are described in detail below. In some implementations, mapping values may be precomputed by a mapping server 160 and then loaded into memory of monitoring engine 140. Computing device 102 may be any desktop computer, a tablet, a smartphone, a server (local or remote), a thin/lean client device, a server, a cloud computing node, and the like. In some implementations, computing device 102 may be an edge device or any device having limited computational resources, but operating in a security-sensitive domain, e.g., a network switch, a gateway device, a card reader, a wireless sensor node, an Internet-of-Things (IoT) node, an embedded system dedicated to one or more specific applications, and so on.

Computing device 102 may support one or more applications 110. The integrity monitoring performed by monitoring engine 140 may be configured for a specific application 110. For example, mapping values used by monitoring engine 140 may be computed based on events that occur in the course of execution of that specific application 110. Computing device 102 may have one or more processors 120, e.g., CPUs, GPUs, field-programmable gate arrays (FPGA), application-specific integration circuits (ASICs), and the like. "Processor" refers to a device capable of executing instructions encoding arithmetic, logical, or I/O operations. In one illustrative example, a processor may follow Von Neumann architectural model and may include one or more arithmetic logic units (ALUs), a control unit, and may further have access to a plurality of registers, or a cache 122.

Computing device 102 may have access to one or more system memory 130 devices. The system memory 130 may refer to any volatile or non-volatile memory and may include a read-only memory (ROM) 132, a random-access memory (RAM) 134, as well as (not shown) electrically erasable programmable read-only memory (EEPROM), flash memory, flip-flop memory, or any other device capable of storing data. RAM 134 may be a dynamic random-access memory (DRAM), synchronous DRAM (SDRAM), a static memory, such as static random-access memory (SRAM), and the like. In some implementations, processor(s) 120 and the system memory 130 may be implemented as a single controller, e.g., as an FPGA.

Computing device 102 may further include an input/output (I/O) interface 104 to facilitate connection of the computing device 102 to various peripheral hardware devices (not shown) such as card readers, terminals, printers, scanners, IoT devices, and the like. Computing device 102 may further include a network interface 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from computing device 102. Various hardware components of the computing device 102 may be connected via a system bus 112 that may include its own logic circuits, e.g., a bus interface logic unit (not shown).

Application(s) 110 supported by computing device 102 may include machine-learning application(s), graphics application(s), computational application(s), cryptographic application(s) (such as authentication, encryption, decryption, secure storage application(s), etc.), embedded application(s), external application(s), or any other types of application(s) that may be executed by computing device 102. Application(s) 110 may be instantiated on the same computing device 102, e.g., by an operating system executed by the processor 120 and residing in the system memory 130. Alternatively, the external application(s) 110 may be instantiated by a guest operating system supported by a virtual machine monitor (hypervisor) operating on the computing device 102. In some implementations, the external application(s) may reside on a remote access client device or a remote server (not shown), with the computing device 102 providing computational and/or cryptographic support for the client device and/or the remote server.

The processor 120 may include one or more processor cores having access to a single or multi-level cache and one or more hardware registers. In implementations, each processor core may execute instructions to run a number of hardware threads, also known as logical processors. Various logical processors (or processor cores) may be assigned to one or more application(s) 110, although more than one processor core (or a logical processor) may be assigned to a single application for parallel processing. A multi-core processor may simultaneously execute multiple instructions. A single-core processor may typically execute one instruction at a time (or process a single pipeline of instructions). The processor 120 may be implemented as a single integrated circuit, two or more integrated circuits, or may be a component of a multi-chip module.

Monitoring engine 140 may be a separate hardware engine equipped with a separate processor 141 and memory and may perform various operations of the monitoring stage, consistent with this disclosure. Monitoring engine 140 may perform integrity monitoring of operations of processor 120, state of memory 130, of various hardware devices connected to computing device 102 via I/O interface 104, etc., that perform or facilitate operations of application(s) 110. Monitoring engine 140 may receive a representation of the state of computing device 102, e.g., an event identification value EIV and process the received EIV using an EIV hashing module 142 to obtain pointers $P_1^{(i)}$, $P_2^{(i)}$ . . . into mapping arrays 150-1, 150-2 . . . 150-N and coefficients $C_0^{(i)}$, $C_1^{(i)}$, etc. Event response value processing module 144 may retrieve the mapping values identified by the pointers and compute the event response value R. Event response module 146 may then determine a type of the event, based on the event response value R. If the event response value is indicative of a normal operation, event response module 146 may take no action. An event response value indicative of a security-sensitive operation, event response module 146 may trigger an alarm and reset a state of processor 120 and/or memory 130. In case of an event response value indicative of a conditional response operation, event response module 146 may identify, based on the event response value, a specific operation that is to be executed. In some implementations, monitoring engine 140 may be executed in software, e.g., as a module having hypervisor (or host operating system) access rights.

Mapping server 160 may have a processor 162 and a system memory 164 that may include RAM, ROM, high-speed cash, and so on. Mapping server 160 may include one or more applications that may be of the same type as application 110 supported by computing device 102. Mapping server 160 may further include a known event store 166 for the application(s) 110. Known event store 166 may include EIVs of various processing events that may occur during execution of various operations of application(s) 110. For example, known event store 166 may include EIVs that characterize normal execution of application 110, e.g., normal branch operations, jump operations, return operations, normal changes of a security state of the processor/memory, and the like. Additionally, known event store 166 may include EIVs of various known (or simulated) events associated with adversarial attacks, read or write accesses to restricted and/or sensitive memory domains and processor computations, buffer overflows, power surges, hardware faults, and the like.

A mapping array construction module 167 may be accessing each EIV stored in known event store 166 and processing EIVs via an event ID hashing module 168, which may be a module that is similar to event ID hashing module 142 of computing device 102. In particular, both hashing modules may use the same hashing function or the same plurality of hashing functions. The pointers and coefficients generated by event ID hashing module 168 may then be used by mapping array construction module 167 to construct a set of constraints, as briefly described above and disclosed in more detail below. Mapping values obtained by array construction module 167 may be included into mapping arrays 170-$k$. Mapping arrays 170-$k$ may be stored in system memory 264 or in a separate memory device. A loading interface 172 of mapping server 160 may then communicate with a loading interface 148 of computing device 102 to copy the content of mapping arrays 170-$k$ to corresponding mapping array 150-$k$ of monitoring engine 140. In some implementations, each mapping array 150-$k$ is stored on a separate memory device (e.g., a separate RAM or ROM). In some implementations, different mapping arrays 150-$k$ may be stored on the same physical memory device but different logical partitions of the same memory device. The different physical devices or different logical partitions of the same physical device may be accessible, in parallel, by different processing threads or cores (physical or logical) of processor 141.

Although example system architecture 100 depicts separate devices for monitoring stage operations (computing device 102) and mapping stage operations (mapping server 160), in some implementations, both stages may be performed by a single device, e.g., computing device 102. For example, mapping stage may be performed as part of an installation of application(s) 110 and the monitoring stage may be performed during run-time execution of the installed applications.

Figure 2:
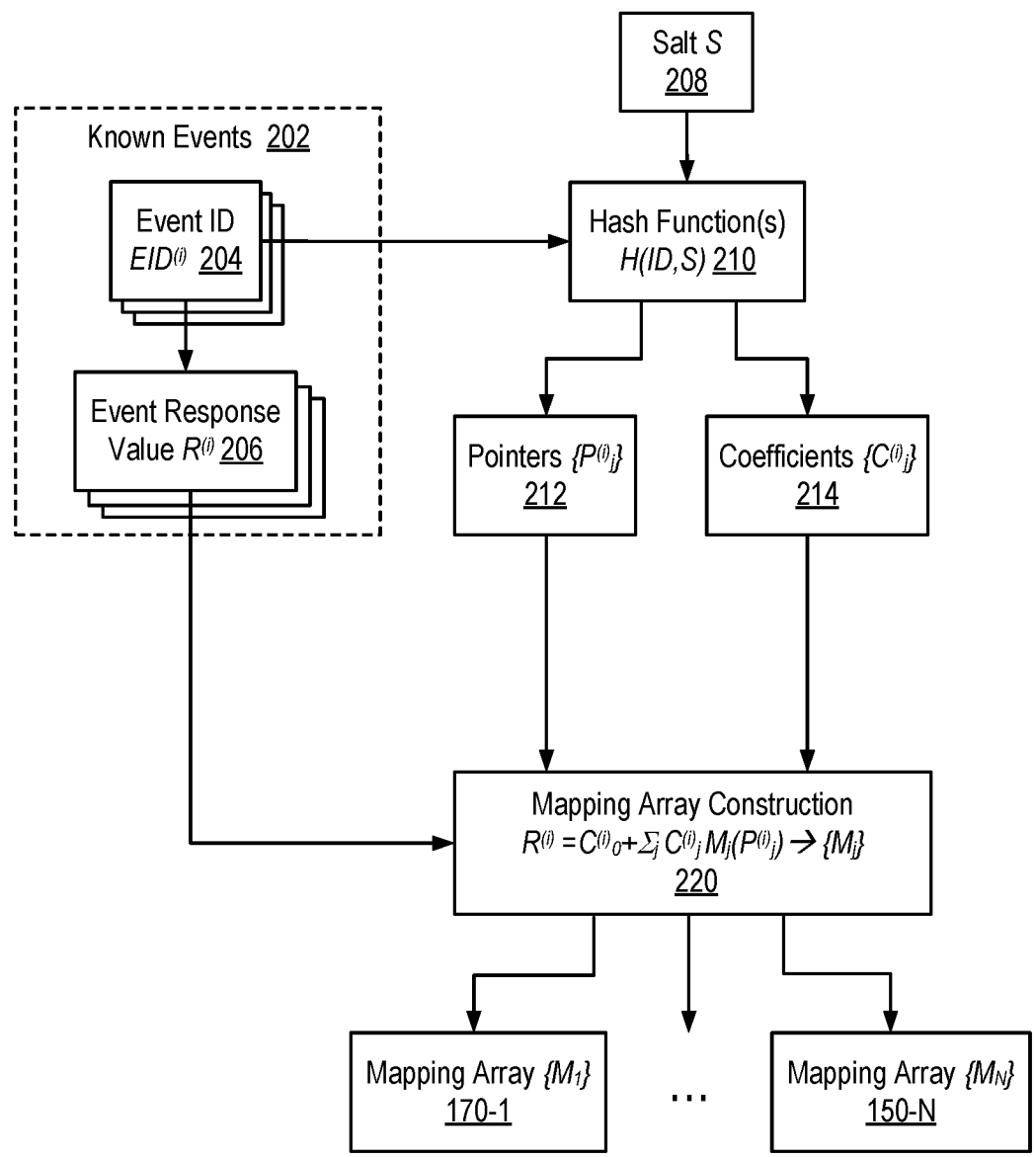
FIG. 2 is a block diagram illustrating example operations of the mapping stage of efficient integrity monitoring of computational operations using multiple mapping arrays, in accordance with some implementations of the present disclosure.

FIG. 2 is a block diagram illustrating example operations 200 of the mapping stage of efficient integrity monitoring of computational operations using multiple mapping arrays, in accordance with some implementations of the present disclosure. Example operations 200 may be performed by processor 162 (of mapping server 160) executing various modules depicted in FIG. 1. More specifically, processor 162 may access a database of known events 202 (e.g., stored in known event store 166 of FIG. 1) and identify an event response value $R^{(i)}$ associated with a respective i-th event, characterized by event identification value $EID^{(i)}$. In some implementations, different EIDs may have different size. For example, a brunch call may have an EID of a length that is different from length of a call to access a secure memory address. In some implementations, different EIDs may have the same value determined by a portion of the memory (e.g., system memory 130) that is being monitored. In some implementations, to ensure that different EIDs have the same target length, EIDs that have a length that is less than the target length may be padded to the target length. Conversely, EIDs that have a length that exceeds (or is below) the target length may be truncated to the target length or processed (e.g., hashed) to map such EIDs to modified EIDs having the target length.

EIDs 204 may then be processed by a mapping function, e.g., hash function (or multiple hash functions) 210 that generates a number of values of a predetermined length, including multiple (e.g., two, three, four, etc.) pointers $P_j^{(i)}$ 212 into j-th mapping array $M_j$ and coefficients $C_j^{(i)}$ 214: $H(EID^{(i)}) \rightarrow \{P_j^{(i)}, C_j^{(i)}\}$. Although, for brevity and conciseness, the term "hash function" is used throughout this disclosure, it should be understood that various other mapping functions may be used instead. For example, a function that compresses data may be used if the bit size of EIDs is larger than the (combined) bit size of pointers 212 and coefficients 214). In some implementations, mapping functions are not compressing data but are pseudo-random functions or any other suitable functions having randomized outputs, so to increase the likelihood that any given set of coefficients 214 results in a solvable system of equations, as described in more detail below. In some implementations, a mapping function is both a pseudo-random function and a compression function. Pointers 212 may have a length that matches the length of memory addresses on a target computing device (e.g., computing device 102) on which the monitoring stage is to be performed. Coefficients $C_j^{(i)}$ 214 may be used in conjunction with the mapping values identified by pointers 212. In some implementations, the number of coefficients 214 may be one more than the number of pointers 212. In some implementations, the size of coefficients 214 may match the size of (e.g., fixed-point) the mapping values to be stored in the mapping arrays.

In some implementations, an input into hash function(s) 210 may further include a salt S value 208, $H(EID^{(i)}, S) \rightarrow \{P_j^{(i)}, C_j^{(i)}\}$. Salt value 208 may be some predetermined or a randomly selected number, e.g., a small number of 8 bits, 16 bits, etc. As described in more detail below, in those instances where the constraints on the mapping values happen to be incompatible due to the specific values of coefficients $C_j^{(i)}$ 214, the salt value 208 may be changed and a new set of coefficients $C_j^{(i)}$ 214 (and pointers $P_j^{(i)}$ 212) may be generated.

Event response values $R^{(i)}$ 206, pointers $P_j^{(i)}$ 212, and coefficients $C_j^{(i)}$ 214 may be used to form N constraints for mapping array construction 220. In some implementations, the constraints may be linear equations (i=1 . . . N):

$$R(i) = C_0^{(i)} + \sum_{j=1}^{l} C_j^{(i)} \cdot M_j(P_j^{(i)}),$$

with i-th equation constraining l mapping values, one mapping value for each of the l mapping arrays $M_j$, the values being identified by the respective pointers 212: $M_1(P_1^{(i)})$, $M_2(P_2^{(i)})$, etc. The N constraints represent N linear equations for n×l mapping values (n being the number of mapping values in each mapping array. The number n×l−N of the mapping values may, therefore, be selected in some other way, e.g., randomly or probabilistically, according to some distribution, such as a uniform distribution, a Gaussian distribution, and so on. In some implementations, n×l−N mapping values may be assigned a specific value (e.g., zero) with the remaining N mapping values determined from the N linear constraints. Computation of the mapping values may be performed using any methods of solving a system of linear equations, e.g., the Gaussian elimination method, the method of substitutions, the method of determinants, and so on. In some implementations, to speed up the solution of the linear equations (constraints), hash function(s) 210 may be selected to generate pointers that are not too far from each other. For example, hash function(s) 210 may be selected in such a way that for most EIV inputs, the pointers $\{P_j\}$ have a range, e.g., a difference between the largest pointer value and the smallest pointer value (for a given input), that is much significantly smaller than the size n of a mapping array. For example, hash functions that have such properties may be constructed based on QARMA, SIMON, GIFT block ciphers, or any similar hash functions.

In some implementations, event response values $R^{(i)}$ 206, coefficients $C_j^{(i)}$ 214, and mapping values may be defined over Galois fields $GF(2^m)$ with m elements. Correspondingly, the multiplications of the coefficients and the mapping elements may be defined as polynomial multiplications. For example, if the coefficients and the mapping elements have 32 bit size (or 64 bit size, etc.) the multiplications may be polynomial multiplications over Galois field $GF(2^{32})$ (or $GF(2^{64})$, etc.). In some implementations, event response values $R^{(i)}$ 206, coefficients $C_j^{(i)}$ 214, and mapping values may be defined over the ring $Z_{2^m}$ of integer values 0 . . . $2^m-1$.

In some implementations, each pointer $P_j^{(i)}$ 212 may identify an r-component vector of mapping values $M_j(P_j^{(i)})$ in the respective mapping array j. Coefficients $C_j^{(i)}$ 214 may similarly be r-component vectors. Correspondingly, the multiplications $C_j^{(i)} \cdot M_j(P_j^{(i)})$ may be scalar (dot product) multiplications (a sum of r component-by-component products). In some implementations, each of the components of the vector of coefficients and a vector or mapping values may be an element of the Galois field $GF(2^m)$.

The output of mapping array construction represents mapping values for each of mapping arrays 170-k. The mapping arrays 170-k may then be provided (as described in more detail in conjunction with FIG. 1) to a different device (e.g., computing device 102) for integrity monitoring of processing and memory operations performed thereon.

Salt value 208 may be selected when the mapping arrays are constructed. The selection of salt value 208 may be performed randomly, in some deterministic way (e.g., using any suitable function), or the like. In some instances, it may be impossible to satisfy the constraints on the mapping values generated with various target response values. For example, a subgroup of m values may happen to be constrained by more than m conditions. In such instances, a new salt value 208 may be selected. This changes mapping of the event response values on the mapping values and results in a new system of linear equations for the mapping values, which may be solvable. Hash function(s) 210, which generates pointers $P_j^{(i)}$ 212, and coefficients $C_j^{(i)}$ 214 may be chosen in such a way that the solving procedure is likely to succeed for a non-negligible fraction of salt values 208, so that the mapping operations do not have to be repeated many times.

Figure 3:
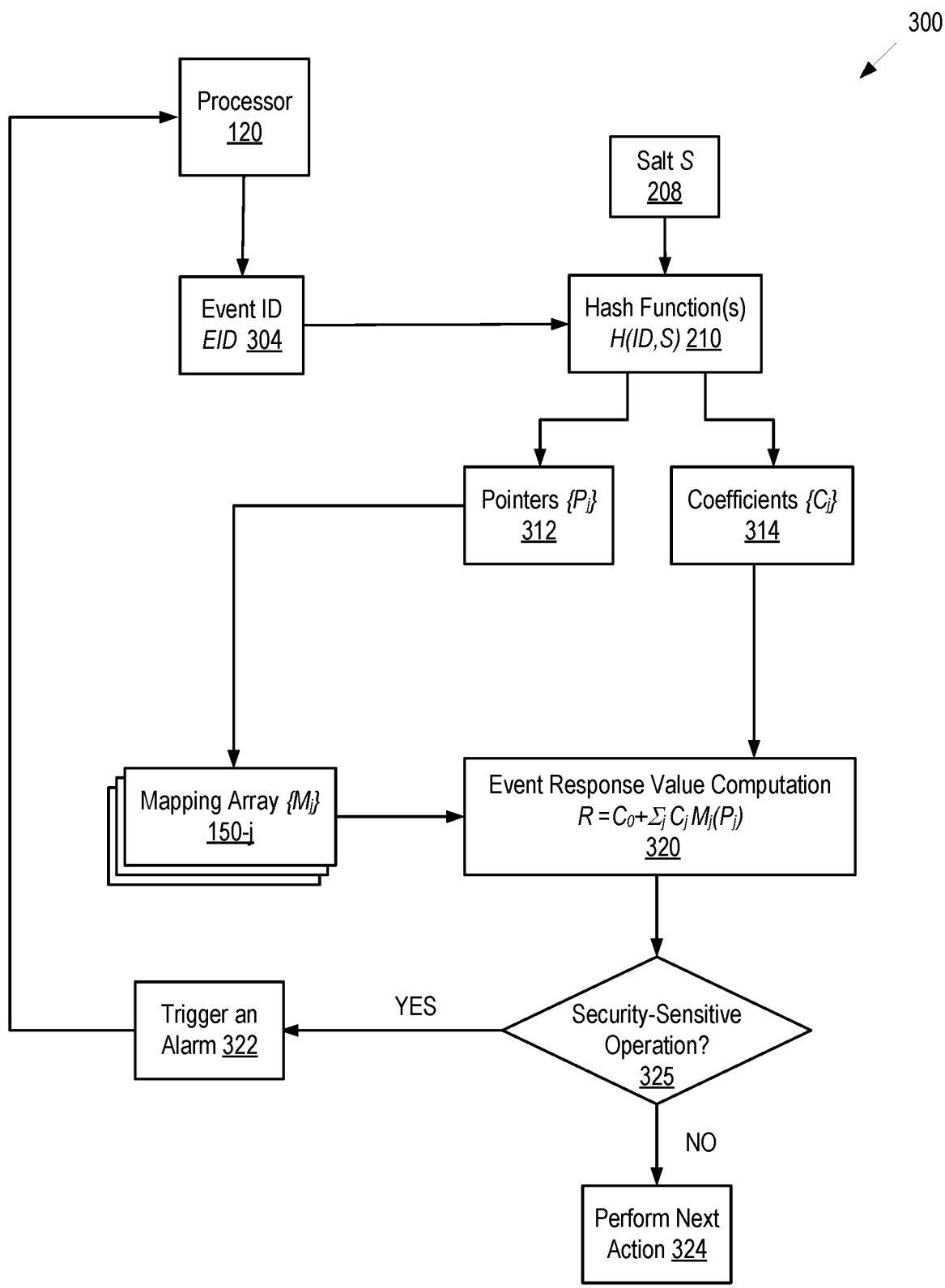
FIG. 3 is a block diagram illustrating example operations of the run-time monitoring stage of efficient integrity monitoring of computational operations using multiple mapping arrays, in accordance with some implementations of the present disclosure.

FIG. 3 is a block diagram illustrating example operations 300 of the run-time monitoring stage of efficient integrity monitoring of computational operations using multiple mapping arrays, in accordance with some implementations of the present disclosure. Example operations 300 may be performed by processor 141 of monitoring engine 140 located on computing device 102. In some implementations, monitoring engine 140 may be located outside computing device 102 but may be communicatively coupled (e.g., via a wired or a wireless connection) to computing device 102. Example operations 300 may be performed to monitor integrity of processing operations executed by processor 120 as well as integrity of system memory 130 of computing device 102. In the course of processing, processor 120 may generate one or more event identification values 304. EIV 304 may be input into hash function 210, which may be the same hash function as used in operations 200 of the mapping stage depicted in FIG. 2. The hash function may also use the same salt value 208.

The output of hash function 210 includes pointers $P_j$ 312, and coefficients $C_j$ 314. Similarly to operations 200 of the mapping stage, each of the pointers $P_j$ identifies a mapping value stored in the respective mapping array 150-*j*. Event response value computation 320 may compute multiplication products of the coefficients $C_j$ with the identified mapping values $M_j(P_j)$ to determine the event response value associated with EID 304:

$$R = C_0 + \sum_{j=1}^{l} C_j \cdot M_j(P_j).$$

In those instances where EID 304 corresponds to one of the known events 202 used in the mapping stage, the computed event response value R reproduces the corresponding target event response value $R^{(i)}$. In those instances where EID 304 is not one of the known EIDs, the computed event response value R may be a representation of an approximate membership of the corresponding event in various classes of the known events.

In the instances where the computed event response value R indicates (at a decision-making block 325) a security-sensitive operation, monitoring engine 140 may trigger an alarm (block 322), change a security state of processor 120 and/or system memory 130 of computing device 102, load a container with a software that performs a security check, set permissions, and the like. In the instances where the computed event response value R indicates a normal operation, monitoring engine 140 may permit processor 120 to perform the next operation.

In one non-limiting example, event response values may be 8-bit numbers, e.g., 00110010. Three most significant bits may be used to indicate whether the event is associated with a security sensitive operation. For example, normal operations may have event response values that have value 0 in the three most significant bits. If any one of the three most significant bits is set (has value 1), the event response value R indicates a security-sensitive operation. Additionally, the fourth most significant bit may signal whether the operation calls for a conditional response, e.g., with the fourth bit being set indicating such an operation. In some implementations, the four least significant bits may indicate how a normal but conditional-response operation should be handled. In some implementations, the four least significant bits may identify an operation in a look-up table that should be performed in response to the event. For example, value R=00110010 may indicate a security-sensitive operation, in response to which the monitoring engine 140 may reset the state of processing device 120. Value R=00000000 may indicate a normal operation that requires no additional action. Value R=00011011 may indicate that an entry #11 (binary value 1011) of the look-up table is to be executed. It should be understood that the above example is intended as an illustration and event response values R may have any suitable number of bits, with any number of bits (e.g., most significant or least significant bits) used to identify a security-sensitive operation and any number of bits used to determine conditional-responses of various operations.

In some implementations, computation of the event response value R may be a two-stage process that determines multiple response values, e.g., a first response value $R_1$ and (if indicated by value $R_1$) a second response value $R_2$. Each of the response values $R_1$ and $R_2$ may be associated with a separate mapping (training) stage. For example, $R_1$ may be an n-bit value that distinguishes security-sensitive operations from normal operations and further distinguishes conditional operations. For example, if n=4, the value $R_1$=0000 may indicate a normal operation, value $R_1$=0001 may indicate a conditional operation, and all other values (e.g., with any of n−1 most significant bits set) may indicate a security-sensitive operation. Correspondingly, a first training stage may map all known normal operations to target event response value $R_1$=0000 and map various known security-sensitive operations to target response values that are different from 0000 or 0001, as described above in conjunction with FIG. 2. If a conditional value ($R_1$=0001) is detected, the second stage may be initiated with a second response value $R_2$ determined. The second response value $R_2$ may be an m-bit value that identifies one of (up to) $2^m$ conditional response actions. A second mapping stage can map various conditional operations that have to be followed with a conditional response to various values of $R_2$. For example, value $R_2$=0001 may indicate that an access request to a memory address is to be granted, value $R_2$=0010 may indicate that an access request to a memory address is to be denied, value $R_2$=0011 may indicate that the processor control is to be passed to a hypervisor, and so on. The second mapping stage may be performed similarly to the first mapping stage but with different target values $R_2$ being used to construct a second set of linear constraints. In some implementations, hash function(s) used in the second mapping stage may be different from the hash function(s) used in the first mapping stage. Similarly, the second mapping stage may use additional mapping arrays whose number may be different from the number of mapping arrays used for mapping (and monitoring) of event response values $R_1$. The second monitoring stage may be performed as described in conjunction with FIG. 3, e.g., utilizing the hash function(s) used in the second mapping stage. In some implementations, an additional information may be used as an input into hash function(s) used in the second mapping stage. The additional information may include any data that is not included in EID 204, e.g., the content of additional memory of computing device 102 that has not been used during the first mapping stage. The same additional content may be collected and input into has functions(s) during run-time integrity monitoring.

The second mapping and monitoring stages may use any of the techniques described above in relation to the first mapping and monitoring stages, including utilizing the Galois field representation with polynomial multiplication, multi-component vectors mapping values with dot product multiplication, and the like. When Galois fields are used, since the Galois fields do not have inherently more or less significant bits, any suitable convention may be used for selecting bits that are used for distinguishing normal operations from security-sensitive operations (e.g., bits of response value $R_1$) and bits that are used for selecting conditional response operation operations (e.g., bits of response value $R_2$).

The implementations described in conjunction with FIGS. 2-3 illustrate mapping using linear sparse functions. In some implementations, nonlinear sparse function mapping may be used. More specifically, during the monitoring stage, the event response value R may be computed using a nonlinear mapping function of the set of identified (by the respective pointers $P_j$) mapping values $\{M_j(P_j)\}$ $$R=F[\{C_j\},\{M_j(P_j)\}],$$

where the nonlinear mapping function depends on a set of parameters $\{C_j\}$. The pointers $\{P_j\}$ and parameters $\{C_j\}$ may be computed using hash functions, as described above in conjunction with linear sparse mappings. Correspondingly, during the mapping stage, event response values $R^{(i)}$ of known events may be used as nonlinear constraints on the mapping values identified by the respective pointers $\{P_j^{(i)}\}$, $$R^{(i)}=F[\{C_j^{(i)}\},\{M_j(P_j^{(i)})\}],$$

with the same mapping function F[.] and the same parameters $\{C_j^{(i)}\}$ computed using the hash functions previously used in the monitoring stage. The mapping function F[.] may be an invertible function, to allow successful identification of the mapping values based on the set of nonlinear constraints provided by the set of values $\{R^{(i)}\}$.

Figure 4:
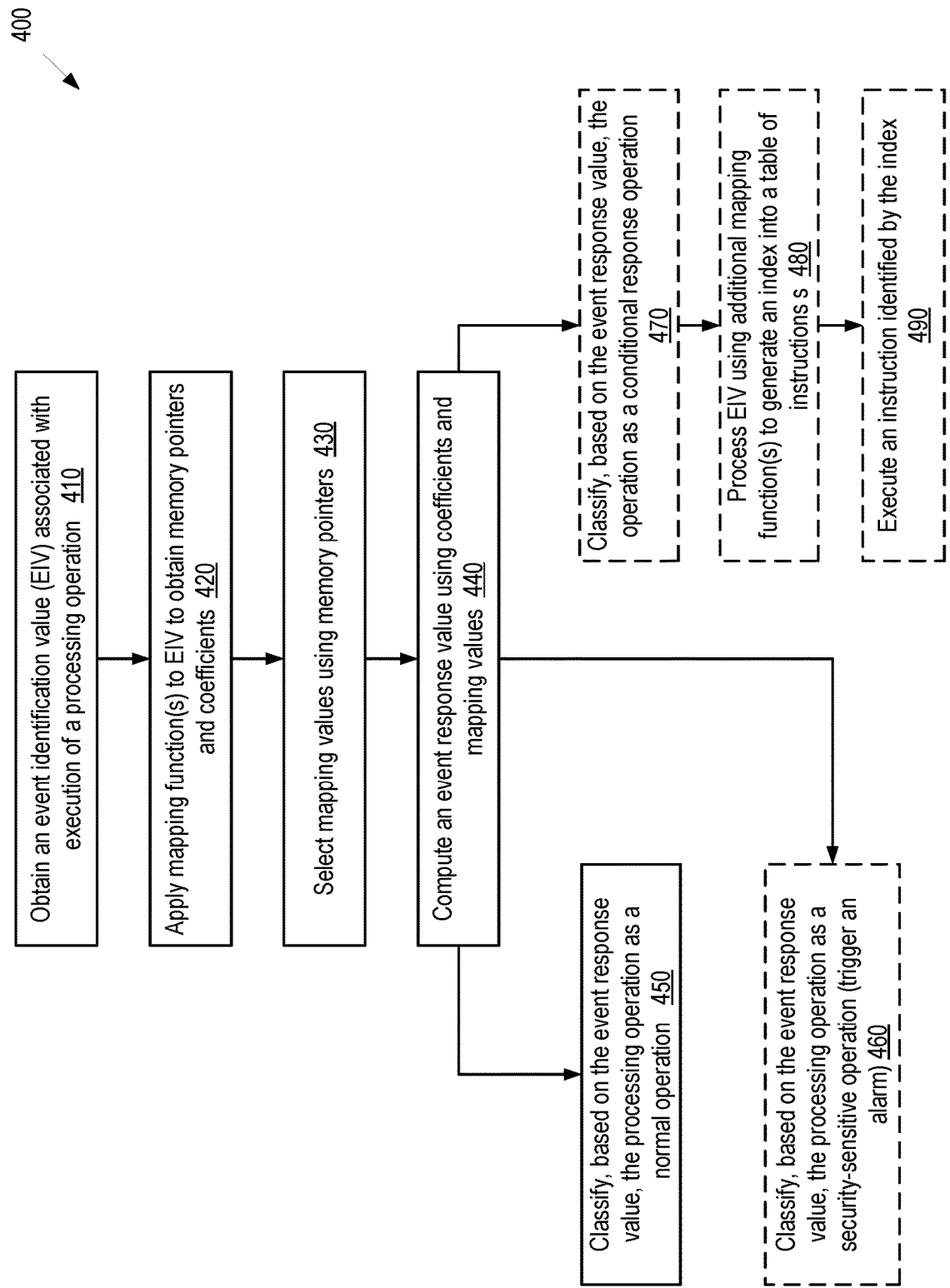
FIG. 4 is a flow diagram depicting example method of run-time integrity monitoring of computational operations using multiple mapping arrays, in accordance with one or more aspects of the present disclosure.
Figure 5:
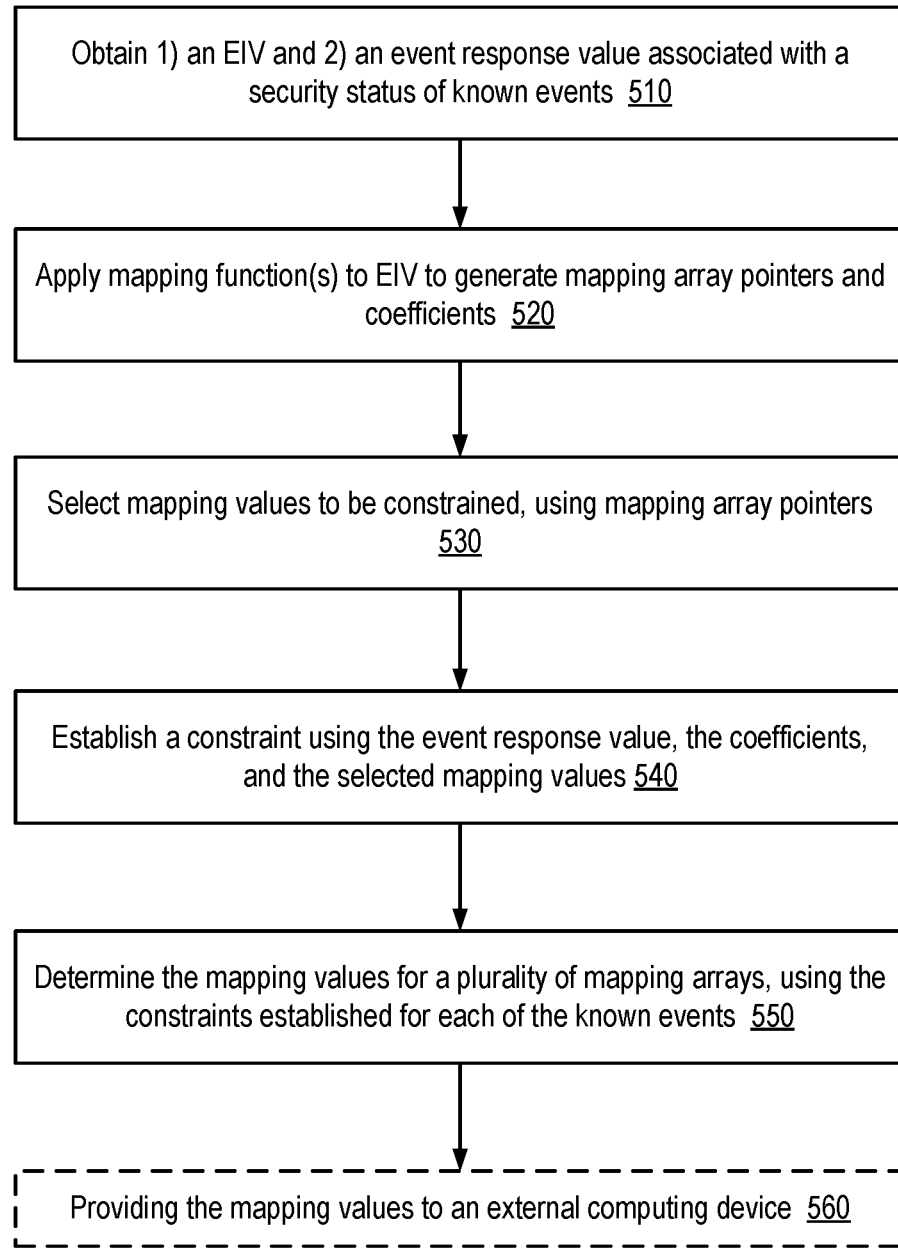
FIG. 5 is a flow diagram depicting example method of performing a mapping stage of efficient integrity monitoring of computational operations using multiple mapping arrays, in accordance with one or more aspects of the present disclosure.

FIGS. 4-5 are flow diagrams depicting illustrative methods 400-500 of efficient integrity monitoring of computational operations using multiple mapping arrays, in accordance with one or more aspects of the present disclosure. Methods 400-500 and/or each of their individual functions, routines, subroutines, or operations may be performed by a computing device 102 and/or mapping server 160, of FIG. 1. Various blocks of methods 400-500 may be performed in a different order compared with the order shown in FIGS. 4-5. Some operations of the methods may be performed concurrently with other operations. Some operations may be optional. Methods 400-500 may be implemented to support execution of any secure applications, cryptographic application, and the like. In some implementations, methods 400-500 may be performed as part of execution of any other application, to ensure integrity of processing and memory operations, correct sequence of program calls, memory read and write operations, and the like. In some implementations, at least some operations of methods 400-500 may be performed in parallel, each parallel processing thread or cores executing one or more individual functions, routines, subroutines, or operations of the methods. In some implementations, parallel threads or cores implementing any of methods 400-500 may be synchronized (e.g., using semaphores, critical sections, and/or other thread synchronization mechanisms). Alternatively, threads implementing methods 400-500 may be executed asynchronously with respect to each other. Various operations of methods 400-500 may be performed in a different order compared with the order shown in FIGS. 4-5. Some operations of methods 400-500 may be performed concurrently with other operations. In some implementations of methods 400-500, one or more operations shown in FIGS. 4-5 are not performed.

FIG. 4 is a flow diagram depicting example method 400 of run-time integrity monitoring of computational operations using multiple mapping arrays, in accordance with one or more aspects of the present disclosure. In some implementations, method 400 may be performed by an edge device or any device having limited processing and/or memory resources. A device performing method 400 may include a processing device (e.g., any processor, microcontroller, CPU, FPGA, ASIC, finite state machine, etc.) and a memory subsystem communicatively coupled to the processing device. The memory subsystem may include a plurality of memory devices or a single device having a plurality of logic partitions that may be accessed independently (e.g., in parallel). In some implementations, each of the plurality of memory partitions may be hosted by a separate random access memory device. The processing device and the memory subsystem may be components of a hardware monitoring engine, e.g., monitoring engine 140 of FIG. 1, that monitors processing operations and memory states of any suitable computing device. The computing device may include a processor (e.g., processor 120 in FIG. 1) and a memory (e.g., system memory 130) that are different from the processor and the memory subsystem of the monitoring engine.

At block 410, the processing device may obtain an event identification value (EIV) representative of a state of a computing device associated with execution of a processing operation on the computing device. The EIV may include (or represent) any digital data characterizing a state of the processor and memory of the computing device. At block 420, method 400 may continue with the processing device applying one or more mapping functions to the EIV to obtain a plurality of memory pointers (e.g., $P_j$, as describe in conjunction with FIG. 3) and a plurality of coefficients (e.g., $C_j$). In some implementations, each of the plurality of pointers may include a memory address in a separate memory partition (e.g., $M_j$). In some implementations, a bit size of the memory pointers may correspond to the bit size of the memory addresses of the corresponding memory partition and a bit size of the coefficients may correspond to the bit size of data segments stored at those memory addresses. In some implementations, mapping function(s) may be deterministic function(s) capable of compressing data. In some implementations, mapping function(s) may be pseudo-random functions. In some implementations, mapping function(s) may be hash functions. In some implementations, mapping function(s) may be applied to specific portion of the EIV(s) as memory pointers and coefficients.

At block 430, the processing device performing method 400 may select a plurality of mapping values (e.g., $M_j(P_j)$). The plurality of mapping values may be selected from a respective array of the plurality of arrays of mapping values using a respective one of the plurality of memory pointers. In some implementations, to select the plurality of mapping values, the processing device accesses, in parallel, the plurality of memory partitions and loads, from each of the plurality of memory partitions, a respective one of the plurality of mapping values. In some implementations, each of the plurality of coefficients (e.g., $C_j$) and each of the plurality of selected mapping values (e.g., $M_j(P_j)$) may be an element of a Galois finite field, e.g., the field $GF(2^m)$ with $2^m$ elements representing different polynomials of degree m.

At block 440, method 400 may include compute an event response value using the plurality of coefficients and the plurality of selected mapping values. For example, in implementations that use sparse linear mapping functions, computing the event response value (e.g., R) may include multiplying each of the plurality of coefficients by a respective one or the plurality of selected mapping values, e.g., $C_j \cdot M_j(P_j)$, and may further include taking the sum of the resulting multiplication products. In some implementations, computing the event response value may include adding a value (e.g., $C_0$) that is independent of the content of the mapping arrays. In some implementations, different physical or virtual processing cores of the processing device may compute, in parallel, the multiplication products of each loaded mapping value (e.g., $M_j(P_j)$) by a respective one of the plurality of coefficients (e.g., $C_j$). In some implementations, each of the plurality of coefficients and each of the plurality of mapping values comprises a multi-component vector. In such implementations, computing the event response value R may include computing a scalar dot product of each of the plurality of coefficients and a respective one or the plurality of mapping values.

Method 400 may continue with performing one or more of a number of actions that are contingent on the event response value. For example, at block 450, the processing device performing method 400 may classify, based on the event response value R, the processing operation as a normal operation. For example, if certain (e.g., n most or least significant) bits of the event response value are clear (or set), the processing operation performed by the computing device being monitored may be a normal operation and the monitoring engine may take no action in reference to the processing operation.

Alternatively, at block 460, method 400 may continue with the processing device classifying the processing operation as a security-sensitive operation and triggering an alarm state of the computing device. For example, if certain (e.g., n-1 most or least significant) bits of the event response value are not all clear (or set), the processing operation may be classified as a security-sensitive operation. In some implementations, the alarm state may cause some (e.g., one or more) of the following actions: a reset of a current state of the computing device, an abortion of a current operation being performed by the computing device a change of a security state of the computing device, a memory erasure of the computing device, and so on.

In some implementations, the memory erasure may be performed for any part of the memory of the computing device, such as registers of the processor of the computing device, high-speed cache of the computing device, RAM of the computing device, and the like, or any combination thereof. In some implementations, the current operation being performed by the computing device may be different from the processing operation being monitored. For example, the computing device may be performing the (one or more) next operation(s) while the monitoring engine is monitoring integrity of a previous processing operation. In some implementations, e.g., in highly secure applications, the computing device may be awaiting a determination by the monitoring engine of the integrity of the most recent processing operation and not performing the next operation until the monitoring engine makes the determination that the most recent processing operation was a normal operation.

In some implementations, as depicted with an optional block 470 (and optional blocks 480, 490), method 400 may include classifying the processing operation as one of conditional response operations. For example, n most (or least) significant bits of the event response value may be clear (or set), like in a normal operation, but some of the m least significant bits may be set (or clear). In such instances, method 400 may continue, at block 480, with processing the EIV using an additional one or more mapping functions to generate an index (e.g., $R_2$) into a table that includes a plurality of instructions. The instructions may specify a response of the computing device to a corresponding one of a plurality of conditional response operations. At block, 490 method 400 may include causing the computing device to execute a specific instruction (of the plurality of instructions), that is identified by the generated index.

FIG. 5 is a flow diagram depicting example method 500 of performing a mapping stage of efficient integrity monitoring of computational operations using multiple mapping arrays, in accordance with one or more aspects of the present disclosure. In some implementations, method 500 may be performed by the same monitoring engine that performs method 500. In some implementations, method 500 may be performed by a different device, e.g., mapping server 160 of FIG. 1. Method 500 may be used to determine mapping values for a plurality of mapping arrays that collectively represent a set of known events associated with operations of a computing device. The mapping values may subsequently be used in operations of method 400, as described above. Method 500 may be performed by a processing device (e.g., processor 162) of a mapping server (e.g., mapping server 160) and may include processing a set of known events. In particular, for each of the set of known events (enumerated with superscript (i)), method 500 may perform blocks 510-540.

At block 510, operations of method 500 may include obtaining an event identification value $EIV^{(i)}$ and an event response value $R^{(i)}$. The event response value $R^{(i)}$ is associated with a security status of a respective known event (i). In particular, the event response value for a first subset of known events may include one or more first values indicative of a normal event. For example, the event response value for normal events may include n most (or least) significant bits that are clear (or set). Additionally, the event response value for a second subset of known events may include one or more second values indicative of a security-sensitive event. For example, at least some of the n most (or least) significant bits of the event response value being set (or clear) may be indicative of a securing-sensitive event.

At block 520, operations of method 500 may include applying one or more mapping functions to $EIV^{(i)}$ to generate a plurality of mapping array pointers $\{P_j^{(i)}\}$ and a plurality of coefficients $\{C_j^{(i)}\}$. In some implementations, the one or more mapping functions generate the plurality of mapping array pointers having a difference between a largest pointer and a smallest pointer that is no more than ten intervening pointers for at least ninety percent of EIVs for the set of known events. For example, if mapping array pointers $P_j^{(i)}$ are selected from a set of consecutive integer numbers, e.g., [0, 5000], the difference between the maximum pointer (for a given i) and the minimum pointer, $P_{max}^{(i)} - P_{min}^{(i)} \leq 12$.

At block 530, operation of method 500 may include selecting a plurality of mapping values to be constrained, e.g., selecting from each mapping array of the plurality of mapping arrays using a respective one of the plurality of mapping array pointers, $M_j(P_j^{(i)})$. At block 540, method 500 may include establishing a constraint using the event response value, the plurality of coefficients, and the selected plurality of mapping values to be constrained, e.g., $R^{(i)} = C_0^{(i)} + C_1^{(i)} \cdot M_1(P_1^{(i)}) + C_2^{(i)} \cdot M_2(P_2^{(i)}) + \ldots$. As illustrated with this non-limiting example, establishing the constraint includes using a sum of multiplications of each of the plurality of coefficients $C_j^{(i)}$ and a respective one of the selected plurality of mapping values, $M_j(P_j^{(i)})$.

At block 550, method 500 may continue with determining the mapping values for the plurality of mapping arrays, using the constraints established (at block 540) for each of the known events. At optional block 560, method 500 may include providing the determined mapping values for each of the mapping arrays to an external computing device (e.g., computing device 102 in FIG. 1).

In some implementations of method 500, an input into the one or more mapping functions (together with the EIV) includes a salt value. In some implementations, prior to applying the one or more mapping functions to the EIV, method 500 may include changing the salt value from a first salt value to a second salt value responsive to a previous unsuccessful attempt to determine the mapping values using the first salt value.

Figure 6:
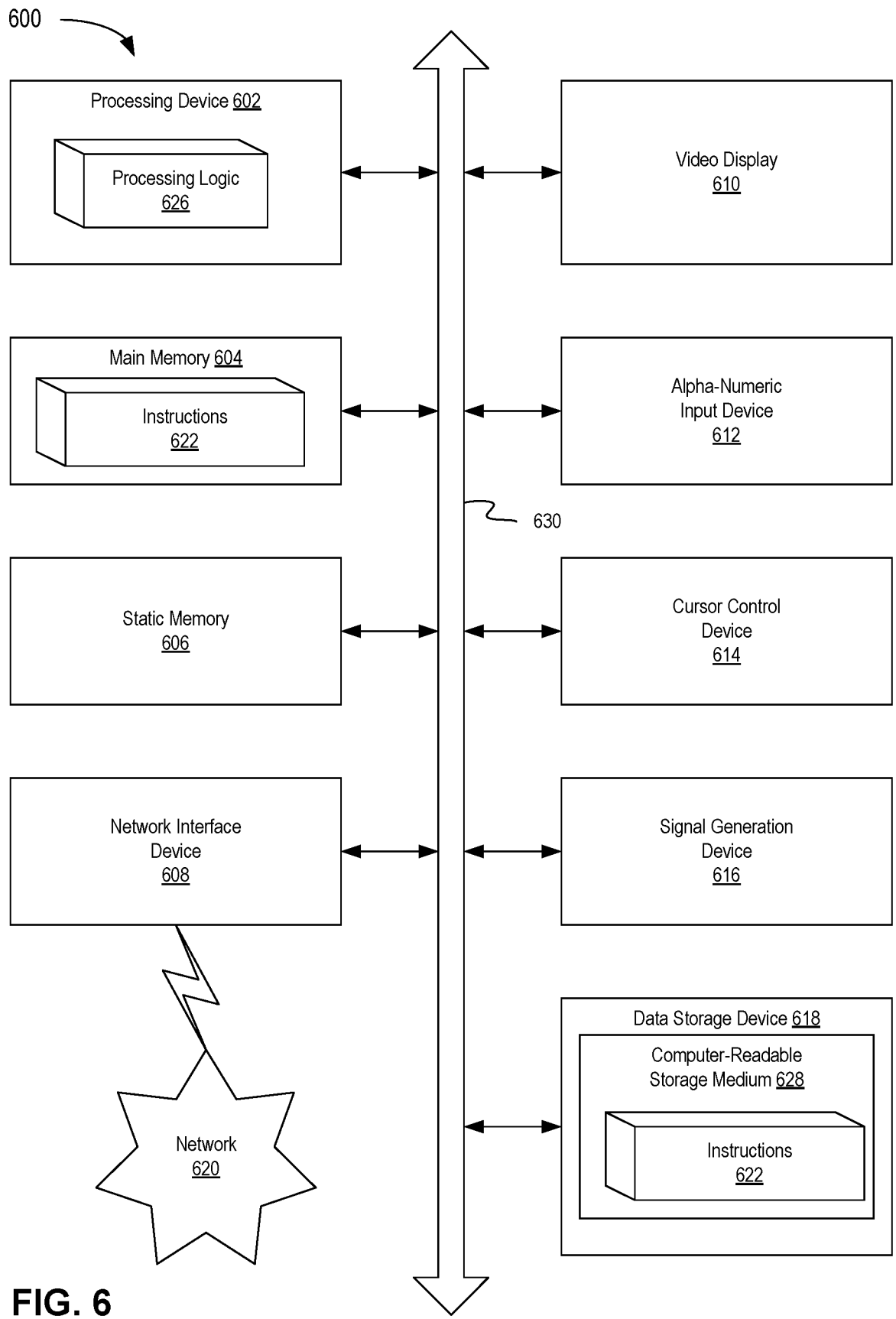
FIG. 6 depicts a block diagram of an example computer system operating in accordance with one or more aspects of the present disclosure.

FIG. 6 depicts a block diagram of an example computer system 600 operating in accordance with one or more aspects of the present disclosure. In various illustrative examples, example computer system 600 may be computing device 102, illustrated in FIG. 1. Example computer system 600 may be connected to other computer systems in a LAN, an intranet, an extranet, and/or the Internet. Computer system 600 may operate in the capacity of a server in a client-server network environment. Computer system 600 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 600 may include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which may communicate with each other via a bus 630.

Processing device 602 represents one or more general-purpose processing devices such as a microprocessor, central processing unit, or the like. More particularly, processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 602 may be configured to execute instructions implementing method 400 of run-time integrity monitoring of computational operations using multiple mapping arrays and method 500 of performing a mapping stage of efficient integrity monitoring of computational operations using multiple mapping arrays.

Example computer system 600 may further comprise a network interface device 608, which may be communicatively coupled to a network 620. Example computer system 600 may further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 may include a computer-readable storage medium (or, more specifically, a non-transitory computer-readable storage medium) 628 on which is stored one or more sets of executable instructions 622. In accordance with one or more aspects of the present disclosure, executable instructions 622 may comprise executable instructions implementing method 400 of run-time integrity monitoring of computational operations using multiple mapping arrays and method 500 of performing a mapping stage of efficient integrity monitoring of computational operations using multiple mapping arrays.

Executable instructions 622 may also reside, completely or at least partially, within main memory 604 and/or within processing device 602 during execution thereof by example computer system 600, main memory 604 and processing device 602 also constituting computer-readable storage media. Executable instructions 622 may further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
   a memory subsystem storing a plurality of arrays of mapping values collectively representative of known events associated with operations of a computing device, wherein the memory subsystem comprises a plurality of memory partitions, each of the plurality of memory partitions storing a respective array of the plurality of arrays of mapping values; and
   a processing device communicatively coupled to the memory subsystem, wherein the processing device is to:
      obtain an event identification value (EIV) representative of a state of a computing device associated with execution of a processing operation on the computing device;
      apply one or more mapping functions to the EIV to obtain a plurality of memory pointers and a plurality of coefficients;
      select a plurality of mapping values, wherein each of the plurality of mapping values is selected from a respective array of the plurality of arrays of mapping values using a respective one of the plurality of memory pointers;
      compute an event response value, using the plurality of coefficients and the plurality of selected mapping values; and
      classify, based on the event response value, the processing operation among a plurality of classes, the plurality of classes comprising a normal operation and a security-sensitive operation.

2. The system of claim 1, wherein each of the plurality of memory partitions is hosted by a separate random access memory device.

3. The system of claim 1, wherein to compute the event response value, the processing device is to multiply each of the plurality of coefficients by a respective one or the plurality of selected mapping values.

4. The system of claim 1, wherein each of the plurality of coefficients and each of the plurality of selected mapping values is an element of a Galois finite field.

5. The system of claim 1, wherein the processing device is to classify the processing operation as a security-sensitive operation and trigger an alarm state of the computing device.

6. The system of claim 5, wherein the alarm state is to cause at least one of:
   a reset of a current state of the computing device;
   an abortion of a current operation being performed by the computing device;
   a change of a security state of the computing device; or
   a memory erasure of the computing device.

7. The system of claim 1, wherein the processing device is further to:
   classify the processing operation as a conditional response operation of a plurality of conditional response operations;
   process the EIV using an additional one or more mapping functions to generate an index into a table comprising a plurality of instructions specifying a response of the computing device to a corresponding one of a plurality of conditional response operations; and
   cause the computing device to execute an instruction of the plurality of instructions, wherein the instruction is identified by the generated index.

8. The system of claim 1, wherein to select the plurality of mapping values, the processing device is to access, in parallel, the plurality of memory partitions and load, from each of the plurality of memory partitions, a respective one of the plurality of mapping values.

9. The system of claim 8, wherein the processing device is further to multiply, in parallel, each loaded mapping value by a respective one of the plurality of coefficients.

10. The system of claim 1, wherein each of the plurality of coefficients and each of the plurality of selected mapping values comprises a multi-component vector, and wherein to compute the event response value, the processing device is to compute a scalar dot product of each of the plurality of coefficients and a respective one or the plurality of selected mapping values.

11. A method to determine mapping values for a plurality of mapping arrays that collectively represent a set of known events associated with operations of a computing device, the method comprising,
   for each of the set of known events:
      obtaining an event identification value (EIV) and an event response value, wherein the event response value is associated with a security status of a respective known event;
      applying, by a processing device, one or more mapping functions to the EIV to generate a plurality of mapping array pointers and a plurality of coefficients;
      selecting a plurality of mapping values to be constrained, wherein each of the plurality of mapping values is selected from a respective mapping array of the plurality of mapping arrays using a respective one of the plurality of mapping array pointers; and
      establishing a constraint using the event response value, the plurality of coefficients, and the selected plurality of mapping values to be constrained;
   the method further comprising:
      determining, by the processing device, the mapping values for the plurality of mapping arrays, using the constraints established for each of the known events.

12. The method of claim 11, wherein establishing the constraint comprises using a sum of multiplications of each of the plurality of coefficients and a respective one of the selected plurality of mapping values.

13. The method of claim 11, wherein the one or more mapping functions generate the plurality of mapping array pointers having a difference between a largest one of the plurality of mapping array pointers and a smallest one of plurality of mapping array pointers that is no more than ten intervening mapping array pointers for at least ninety percent of EIVs for the set of known events.

14. The method of claim 11, wherein the event response value for a first subset of known events comprises one or more first values indicative of a normal event, and wherein the event response value for a second subset of known events comprises one or more second values indicative of a security-sensitive event.

15. The method of claim 11, further comprising:
providing the determined mapping values for each of the mapping arrays to an external computing device.

16. The method of claim 11, wherein an input into the one or more mapping functions comprises a salt value, the method further comprising, prior to applying the one or more mapping functions to the EIV:
changing the salt value from a first salt value to a second salt value responsive to a previous unsuccessful attempt to determine the mapping values using the first salt value.

17. A method to perform integrity monitoring of a processing operation executed on a computing device using a plurality of arrays of mapping values collectively representative of known events associated with operations of the computing device, the method comprising:
obtaining, by a processing device, an event identification value (EIV) representative of a state of the computing device associated with execution of the processing operation on the computing device;
applying, by the processing device, one or more mapping functions to the EIV to obtain a plurality of memory pointers and a plurality of coefficients;
selecting, by the processing device, a plurality of mapping values, wherein each of the plurality of mapping values is selected from a respective array of the plurality of arrays of mapping values using a respective one of the plurality of memory pointers;
computing e an event response value, using the plurality of coefficients and the plurality of selected mapping values; and
classifying, based on the event response value, the processing operation among a plurality of classes, the plurality of classes comprising a normal operation and a security-sensitive operation.

18. The method of claim 17, wherein computing the event response value comprises multiplying each of the plurality of coefficients by a respective one or the plurality of selected mapping values.

19. The method of claim 17, further comprising:
classifying the processing operation as a security-sensitive operation; and
triggering an alarm state of the computing device, wherein the alarm state is to cause at least one of:
a reset of a current state of the computing device;
an abortion of a current operation being performed by the computing device;
a change of a security state of the computing device; or
a memory erasure of the computing device.

20. The method of claim 17, further comprising:
classifying the processing operation as a conditional response operation of a plurality of conditional response operations;
processing the EIV using an additional one or more mapping functions to generate an index into a table comprising a plurality of instructions specifying a response of the computing device to a corresponding one of a plurality of conditional response operations; and
causing the computing device to execute an instruction of the plurality of instructions, wherein the instruction is identified by the generated index.

21. The method of claim 17, wherein selecting the plurality of mapping values comprises:
accessing, in parallel, a plurality of memory partitions;
loading, from each of the plurality of memory partitions, a respective one of the plurality of mapping values; and
multiplying, in parallel, each loaded mapping value by a respective one of the plurality of coefficients.

* * * * *